Dec. 13, 1927.
O. RULE ET AL
1,652,414
TIRE SPREADING DEVICE
Filed Aug. 20, 1927
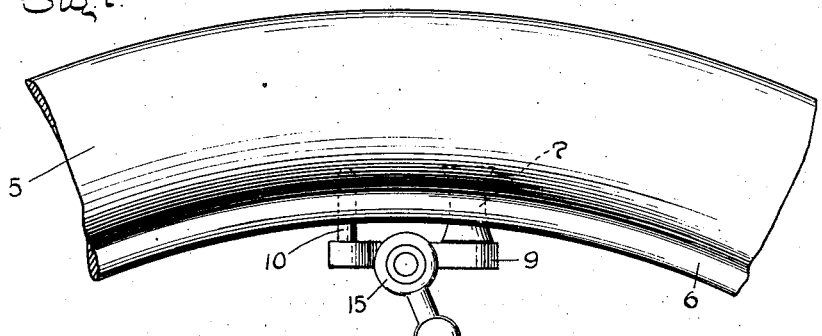
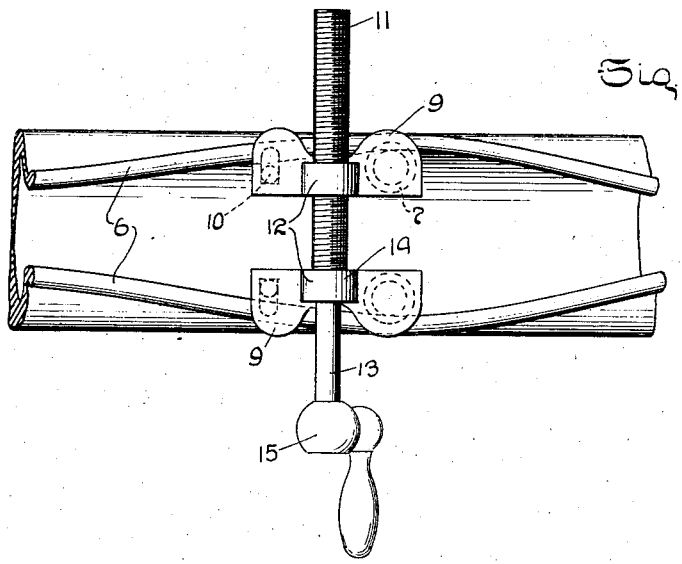
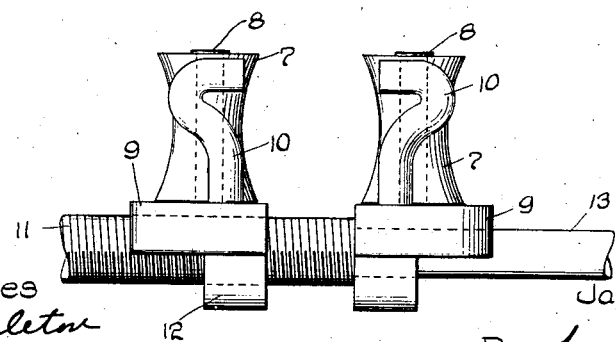
Inventors,
Oliver Rule and
James Albert Bennett Patented Dec. 13, 1927.

1,652,414

UNITED STATES PATENT OFFICE.

OLIVER RULE AND JAMES ALBERT BENNETT, OF CHICAGO, ILLINOIS.

TIRE-SPREADING DEVICE.

Application filed August 20, 1927. Serial No. 214,236.

Our invention relates to a tire spreading device and the object of our invention is to provide such a device which may be collapsed in such a manner that it may be readily inserted between the edges of a deflated tire without the necessity of first forcing them apart.

Another object is to provide such a device which is capable of adjustment for tires of all practical sizes, and which, when inserted and properly expanded, for spreading the tire may be readily drawn around the tire for exposing to view the entire inner surface of the tire and permit inspection of the same.

Our invention will be best understood by reference to the accompanying drawing forming a part of this specification in which:

Figure 1 is an elevational view of a portion of an automobile tire showing a tire spreading device incorporating our invention applied thereto.

Figure 2 is a plan view showing the inner portion of the tire which is held in spread condition by means of our invention.

Figure 3 is an elevational view showing the invention more in detail.

In the drawings, for the purpose of illustration, we have shown the preferred embodiment of our invention. Numeral 5 represents an automobile tire having the usual edges or beads 6, and said tire is shown in a spread condition in Figure 2 for the purpose of inspecting the inner side thereof for nails or other objects which may be harmful to the inner tube. Our spread device consists of a plurality of rollers 7, mounted on pins 8, which are secured to supporting plates 9.

On each of the supporting plates 9, opposite the rollers 7, are rigidly secured curved horn members 10, which are adapted to engage the beads of the tire and guide the spreading device.

The plates 9 are adapted to be spread apart by means of a spreader bolt 11, which has threaded engagement through an opening in a lug 12 of one of said plates. The spreader bolt is provided with a reduced end portion 13 which loosely fits through an opening in a lug 14 of the other supporting plate 9 and the lug 14 engages the shoulder formed by the end of the larger portion of the bolt 11 where it joins the reduced portion 13. Crank handle 15 is secured to the end of the reduced portion 13 and by means of the same said bolt may be rotated and the plates 9 are thereby caused to move relative to each other in a direction depending on the direction of rotation of the bolt. The plates 9 are adapted to engage each other for the purpose of removing the rollers and the guides from the tire and for the purpose of inserting the same in the tire without the necessity of forcing the beads apart for this purpose.

Having described our invention in its preferred form it will be apparent to those skilled in the art that variations may be made therein without departing from the spirit of the invention and we do not therefore wish to be limited to the exact details herein illustrated and described but desire to avail ourselves of such variations and modifications as come within the scope of the appended claims.

We claim as our invention:

1. A tire spreading device comprising horns for engaging the edges of a tire; other cooperating means for engaging said edges; supporting members for said horns and said means; and means for adjusting the distance between said supporting members.

2. A tire spreading device comprising a plurality of supporting plates; a concave roller and a curved horn member for engaging each edge of a tire; said horns being secured to said supporting plates; bearing pins for said rollers secured to said supporting plates; means for adjusting one of said plates laterally with respect to the other.

3. A tire spreading device comprising a plurality of supporting plates; a concave roller and a curved horn member for engaging each edge of a tire; said horns being secured to said supporting plates; bearing pins for said rollers secured to said supporting plates; a spreader bolt engaging portions of said plates for holding said plates in adjusted position and means for rotating said bolt for adjusting the distance between said plates.

4. A tire spreading device comprising a plurality of supporting plates; a concave roller and a curved horn member for engaging each edge of a tire; said horns being secured to said supporting plates; bearing pins for said rollers secured to said supporting plates; a lug on one of said plates having an opening therein and having threaded engagement with a spreader bolt passing therethrough; one end of said bolt having a reduced portion affording a shoulder; the other of said plates having an opening therein loosely fitting over said reduced portion.

5. A tire spreading device comprising a plurality of supporting plates; a concave roller and a curved horn member for engaging each edge of a tire; said horns being secured to said supporting plates; bearing pins for said rollers secured to said supporting plates; a lug on one of said plates having an opening therein and having threaded engagement with a spreader bolt passing therethrough; one end of said bolt having a reduced portion affording a shoulder; the other of said plates having an opening therein loosely fitting over said reduced portion; means for rotating said bolt for spreading said plates.

In testimony whereof we have signed our names to this specification.

OLIVER RULE.
JAMES ALBERT BENNETT.